United States Patent [19]
Sapru et al.

[11] Patent Number: 5,778,972
[45] Date of Patent: Jul. 14, 1998

[54] ROBUST METAL HYDRIDE HYDROGEN STORAGE SYSTEM WITH METAL HYDRIDE SUPPORT STRUCTURE

[75] Inventors: Krishna Sapru, Troy; Srinivasan Venkatesan, Southfield; Ned T. Stetson, Auburn Hills, all of Mich.; Krishnaswamy Rangaswamy, Clarendon Hills, Ill.

[73] Assignee: Energy Coversion Devices, Inc., Troy, Mich.

[21] Appl. No.: 623,497

[22] Filed: Mar. 28, 1996

[51] Int. Cl.⁶ .................................................. F28D 15/00
[52] U.S. Cl. .................. 165/104.12; 62/480; 62/46.2; 62/48.1
[58] Field of Search ................... 137/575, 592, 137/571; 165/104.12; 62/46.2, 48.1, 480

[56] References Cited

U.S. PATENT DOCUMENTS

| | | | |
|---|---|---|---|
| 1,787,916 | 1/1931 | Polson et al. | 137/575 |
| 3,516,263 | 6/1970 | Wiswall, Jr. et al. | 62/48.3 |
| 3,863,664 | 2/1975 | Holbrook et al. | 137/571 X |
| 3,960,174 | 6/1976 | Latimer et al. | 137/575 X |
| 4,383,606 | 5/1983 | Hunter | 62/46.2 |
| 4,396,114 | 8/1983 | Golben et al. | 165/104.12 X |
| 4,548,044 | 10/1985 | Sakai et al. | 165/104.12 X |
| 5,056,318 | 10/1991 | Yonesaki et al. | 62/46.2 |

FOREIGN PATENT DOCUMENTS

| | | | |
|---|---|---|---|
| 0047989 | 3/1983 | Japan | 165/104.12 |
| 0164994 | 9/1983 | Japan | 165/104.12 |
| 0205190 | 10/1985 | Japan | 165/104.12 |
| 0180798 | 7/1988 | Japan | 62/46.2 |
| 5263996 | 10/1993 | Japan | 62/46.2 |
| 1105719 | 7/1984 | U.S.S.R. | 62/46.2 |

*Primary Examiner*—John Rivell
*Assistant Examiner*—Christopher Atkinson
*Attorney, Agent, or Firm*—Marvin S. Siskind; David W. Schumaker; Marc J. Luddy

[57] ABSTRACT

A modular metal hydride hydrogen storage system which can provide a robust and reliable source of hydrogen that can quickly and easily be modified for a variety of applications and environments. The hydrogen storage system comprises at least one storage module. Each storage module comprises a container having at least one open end, a metal hydride hydrogen storage means, means for introducing gaseous hydrogen into and withdrawing gaseous hydrogen from the container, and means for connecting storage modules together end-to-end to form a plurality of storage modules.

19 Claims, 6 Drawing Sheets

ROBUST METAL HYDRIDE HYDROGEN STORAGE SYSTEM WITH METAL HYDRIDE SUPPORT STRUCTURE

FIELD OF THE INVENTION

The present invention is concerned with a hydrogen storage system. More particularly, the present invention is concerned with a metal hydride hydrogen storage system.

BACKGROUND

Hydrogen is stored conventionally as a gas or a liquid. Hydrogen is typically stored as a gas in large, bulky steel cylinders under very high pressures (e.g. 2.000 psi or greater). Hydrogen is normally stored as a liquid in insulated containers at very low temperatures. It is necessary to expend energy to liquify hydrogen gas. This makes cryogenic hydrogen storage highly inefficient for most practical applications.

In recent years, considerable attention has been focused on the storage of hydrogen in the form of metallic compounds, or metal hydrides. The use of metal hydrides permit the storage of relatively large amounts of hydrogen in small volume containers under low pressure. Hydrogen storage in metal hydrides is perhaps the safest way to store and transport hydrogen because the hydrogen is bound in a chemical form. For these reasons, containers for hydrogen storing metal hydrides are significantly different from those used to store gaseous hydrogen.

Generally, the metallic compounds used to store hydrogen are charged by introducing pressurized hydrogen into valved containers where hydrogen reacts exothermically with hydridable material to form the metal hydride compound. The use of solid hydridable materials to store hydrogen is disclosed in numerous patents, such as U.S. Pat. Nos. 3,508,514, 3,516,263 and 4,036,944, each incorporated herein by reference. Such solid hydridable materials can be characterized as exhibiting an interrelation of temperature, partial pressure of gaseous hydrogen and hydrogen content of the hydridable material. At any given temperature, the hydrogen content of the hydridable material is determined by the partial pressure of the hydrogen in contact with that material. Generally, as temperature rises it takes a greater partial pressure of hydrogen to maintain a given concentration of hydrogen in the hydridable material. The converse is also true as temperature decreases.

The reversible storage of hydrogen as a metal hydride has several advantages over conventional gaseous and liquid hydrogen storage. As mentioned above, metal hydrides offer pronounced volumetric advantages over compressed gas, require lower pressure, and are safer. In addition, the hydrogen released from a metal hydride is of very high purity.

There are a number of engineering and design issues that must be addressed in the proper design of a metal hydride hydrogen storage system. One issue is that of an adequately designed heat transfer mechanism. Heat flows out of and into the hydridable material as hydrogen is absorbed and released by the material. Proper operation of a metal hydride hydrogen storage system requires that the underlying design includes a well designed heat transfer means that can appropriately transfer heat out of and into the hydridable material.

A second issue is that of the problem of self-compaction due to particle size reduction. During repeated hydriding and dehydriding cycles, hydridable materials expand and contract as they absorb and desorb hydrogen. Hydridable materials have been found to expand and contract by as much as 25% in volume as a result of hydrogen introduction into and release from the material lattice. As a result of the dimensional change in the hydridable material, the materials crack, undergo fracturing and break up into finer and finer particles. After repeated cycling, the fine particles self-compact causing inefficient hydrogen transfer as well as high stresses that are directed against the walls of the storage container.

A third issue is that of modularity. Hydridable materials for hydrogen storage are used in a variety of industrial and laboratory environments. Small storage units are commonly used as hydrogen sources for laboratory experimentation. Much larger units are needed to provide the quantity of hydrogen necessary for vehicular transportation systems. The diversity of environments requires a modular storage system that can provide a reliable source of hydrogen at a variety of capacities. A storage system is needed that will provide a quick and easy means of connecting multiple metal hydride hydrogen containers together so that system capacity can be modified as needs change. The system must be able to perform reliably under a wide range of environmental conditions regardless of size and capacity, and provide for packaging and storage flexibility in many different physical locations.

While metal hydride hydrogen storage systems have been disclosed in several U.S. Patents, none have appropriately addressed all of the issues that are important for a well designed, robust system. For example, U.S. Pat. No. 4,133,426 to Turillon, discloses a hydrogen storage vessel having particles of hydridable material in a multiplicity of closed containers. It addresses the problem of high stress on the walls of the container resulting from the expansion and contraction of the material during the absorption and desorption of the hydrogen. This patent, however, fails to address the issue of modularity. The storage capacity of the container is fixed and redesign is required to increase capacity on demand.

Similarly, U.S. Pat. No. 4,436,537 to Turillon discloses a hydride container comprising a series of metallic trays arranged in non-nesting configuration. While this patent addresses the issue of improved thermodynamics, it too fails to appropriately address the issue of modularity. The invention contemplates a multiplicity of trays in a conventional container. It fails to disclose any means of increasing system capacity by connecting multiple containers together.

A metal hydride hydrogen storage system is needed that addresses all of the issues necessary for a properly designed storage system. An appropriately designed storage system must include a well designed heat transfer mechanism, adequately address the problem of self-compaction due to particle size reduction, and provide for modularity so that system capacity can be easily modified on demand.

SUMMARY OF THE INVENTION

An object of the present invention is to provide a modular metal hydride hydrogen storage system that is robust and reliable and can be quickly and easily modified for a variety of applications and environments.

This and other objects are achieved by a hydrogen storage system comprising at least one storage module where each storage module comprises: a container having at least one open end, a metal hydride hydrogen storage means within the container, means for introducing gaseous hydrogen into and withdrawing gaseous hydrogen from the container, and means for connecting an end of one container to an end of another container.

3

The object is further achieved by a hydrogen storage system comprising a plurality of storage modules where the closed end of one storage module is connected to the open end of another storage module.

DETAILED DESCRIPTION OF THE INVENTION

The present invention discloses a uniquely designed metal hydride hydrogen storage module that can be connected end-to-end with similar storage modules to form a robust, reliable and well-engineered metal hydride hydrogen storage system.

Figure 1:
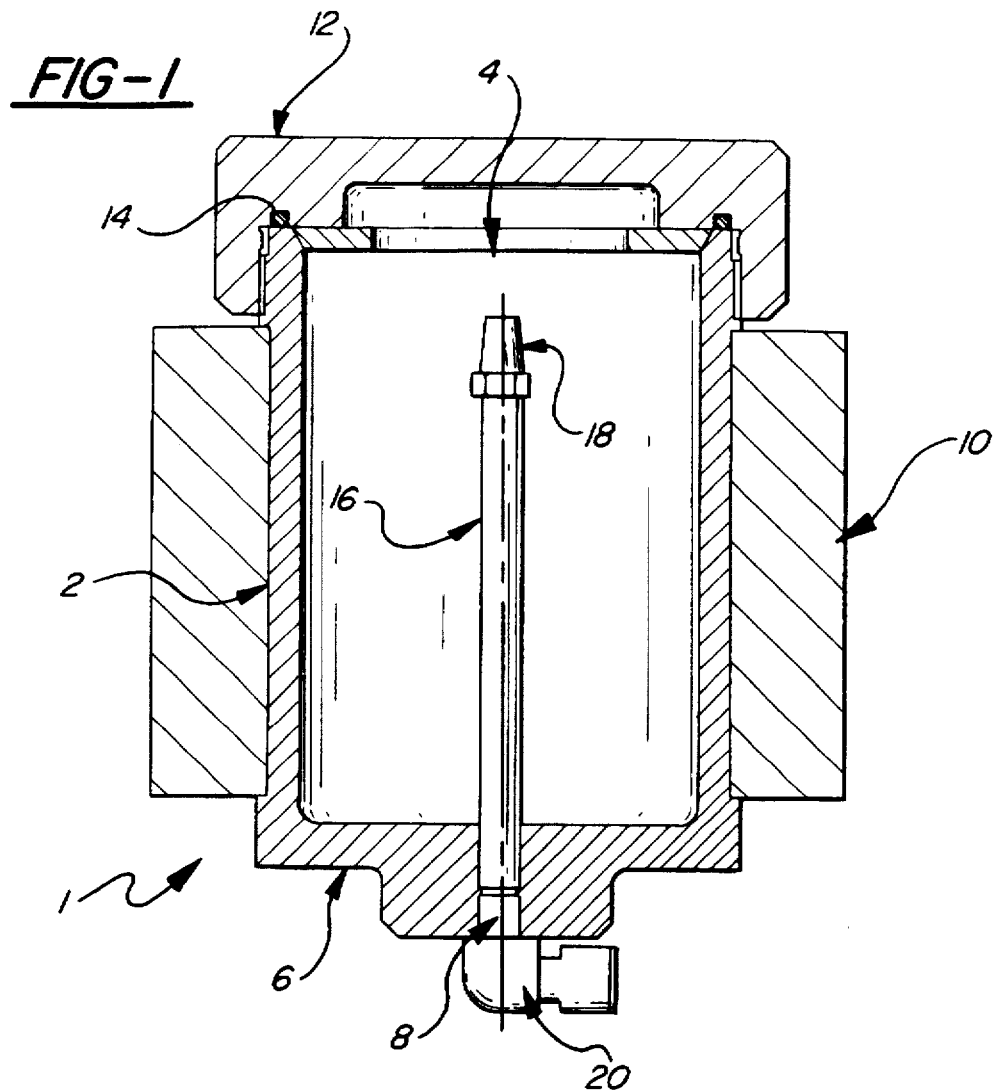
FIG. 1 depicts a single metal hydride hydrogen storage module.

FIG. 1 shows an embodiment of the metal hydride hydrogen storage system of the present invention utilizing a single metal hydride storage module 1. The module comprises a container 2 which may be any shape that can properly store hydridable material. FIG. 1 shows an embodiment of a container 2 which is a cylinder having an open end 4 and a closed end 6 opposite the open end 4. The closed end 6 has a passage port 8.

The hydrogen storage module 1 further comprises a heat transfer means which is necessary to transfer heat away from the metal hydride during the hydrogen absorption process (an exothermic reaction) and to transfer heat into the metal hydride during the hydrogen desorption process (an endothermic reaction). FIG. 1 also shows an embodiment of the heat transfer means comprising a plurality of heat fins 10 which are attached to container 2. The plurality of heat fins are preferably spaced equidistantly around the container 2. The heat transfer means may also comprise heat exchanger tubing The open end 4 of the container 2 may be sealed using the container cap 12. The interior surface of the container cap 12 as well as the sides of the container 2 adjacent to the open end 4 are threaded so that container cap 12 can easily screw onto the open end 4 of the container 2. A cap o-ring 14 is sandwiched between the container cap 12 and the rim of the open end 4 to ensure a tight seal and prevent the escape of hydrogen gas through the open end. While, in this embodiment, the container cap 12 screws onto the container 2, other means of closing the open end of the container, such as compression fittings, plugs, etc., are also possible. Furthermore, the container cap 12 may be fitted with various types of gauges (e.g., temperature and pressure) depending on the application.

A passage means is used to transport gaseous hydrogen into and out of the container 2. One embodiment of the passage means is a passage tube 16 positioned along the axis of the container 2. The passage tube 16 is impermeable to the hydridable material. The passage tube 16 may be either permeable or impermeable to gaseous hydrogen. In the embodiment of the invention shown in FIG. 1, one opening of the passage tube 16 extends into the passage port 8 located in the closed end 6 of the container. The other opening extends into the hydrogen gas region of the interior of the container 2. This opening is covered with a sintered filter 18. The sintered filter 18 prevents impurities from passing through the passage tube 16. The passage tube 16 allows gaseous hydrogen to be introduced into the container and withdrawn from the container by connecting a valve adapter 20 into the passage port 8.

The present invention includes a metal hydride hydrogen storage means for storing hydrogen within the container 2. In one embodiment of the present invention, the storage means comprises a hydridable material physically bonded to a support means. Generally, the support means can take the form of any structure that can hold the hydridable material. Examples of support means include, but are not limited to, mesh, grid, matte, foil, foam and plate. Each may exist as either a metal or non-metal.

The support means may be formed from a variety of materials with the appropriate thermodynamic characteristics that can provide the necessary heat transfer mechanism. These include both metals and non-metals. Preferable metals include those from the group consisting of Ni, Al, Cu, Fe and mixtures or alloys thereof. Examples of support means that can be formed from metals include wire mesh, expanded metal and foamed metal.

The hydridable material used can be formed from a number of hydridable metals, alloys and intermetallic compounds which react reversibly with hydrogen at ambient temperature and modest gas pressures to form metal hydrides. Examples of hydridable materials that can be used include, but are not limited to, the alloys from the $AB_5$ (e.g., $LaNi_5$), AB (e.g., TiFe) and $A_2B$ (e.g., $Mg_2Ni$) families, and their modifications. By using such hydridable materials, hydrogen can be stored and released (e.g., the hydridable material can be hydrogenated and dehydrogenated) at easily attained temperatures and pressures.

The hydridable material may be physically bonded to the support means by compaction and sintering processes. The hydridable material is first converted into a fine hydridable powder. The hydridable powder is then compacted onto the support means. The compaction process causes the hydridable powder to adhere to and become an integral part of the support means. After compaction, the support means that has been impregnated with hydridable powder is preheated and then sintered. The preheating process liberates excess moisture and discourages oxidation of the hydridable powder. Sintering is carried out in a high temperature, substantially inert atmosphere containing hydrogen. The temperature is sufficiently high to promote particle-to-particle bonding of the hydridable material as well as the bonding of the hydridable material to the support means.

Figure 4:
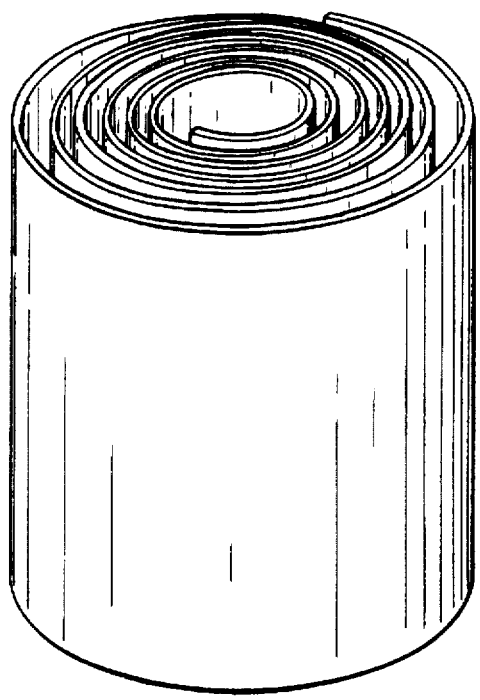
FIG. 4 depicts a support means configured as a spirally wound belt.
Figure 5:
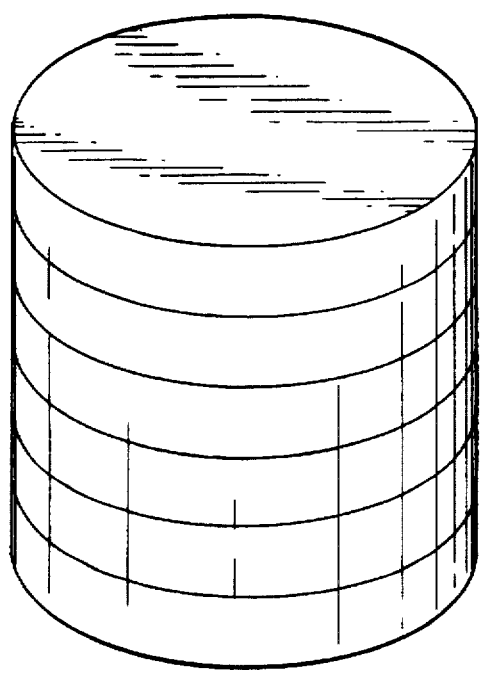
FIG. 5 depicts a support means configured as a plurality of stacked disks.

The support means/hydridable material can be packaged within the container 2 in many different configurations. FIG. 4 shows a configuration where the support means/hydridable material is spirally wound. FIG. 5 shows an alternate configuration where the support means/hydridable material is assembled in the container 2 as a plurality of stacked disks. Other configurations are also possible.

Compacting and sintering hydridable material onto a support means increases the packing density of the hydridable material, thereby improving the thermodynamic and kinetic characteristics of the hydrogen storage system. The close contact between the support means and the hydridable material improves the efficiency of the heat transfer into and out of the hydridable material as hydrogen is absorbed and desorbed. In addition, the uniform distribution of the support means throughout the interior of the container 2 provides for an even temperature and heat distribution throughout the hydridable material. This results in a more uniform rates of hydrogen absorption and desorption throughout the entirety of the hydridable material, thus creating a more efficient energy storage system.

The storage means of the present invention also addresses the problem of self-compaction. The processes used to attach the hydridable material onto the support means keeps the hydridable material particles firmly bonded to each other as well as to the support means during the absorption and desorption cycling. Furthermore, the tight packaging of the support means within the container 2 serves as a mechanical support that keeps the hydridable material particles in place during the expansion, contraction and fracturing of the material.

Figure 2:
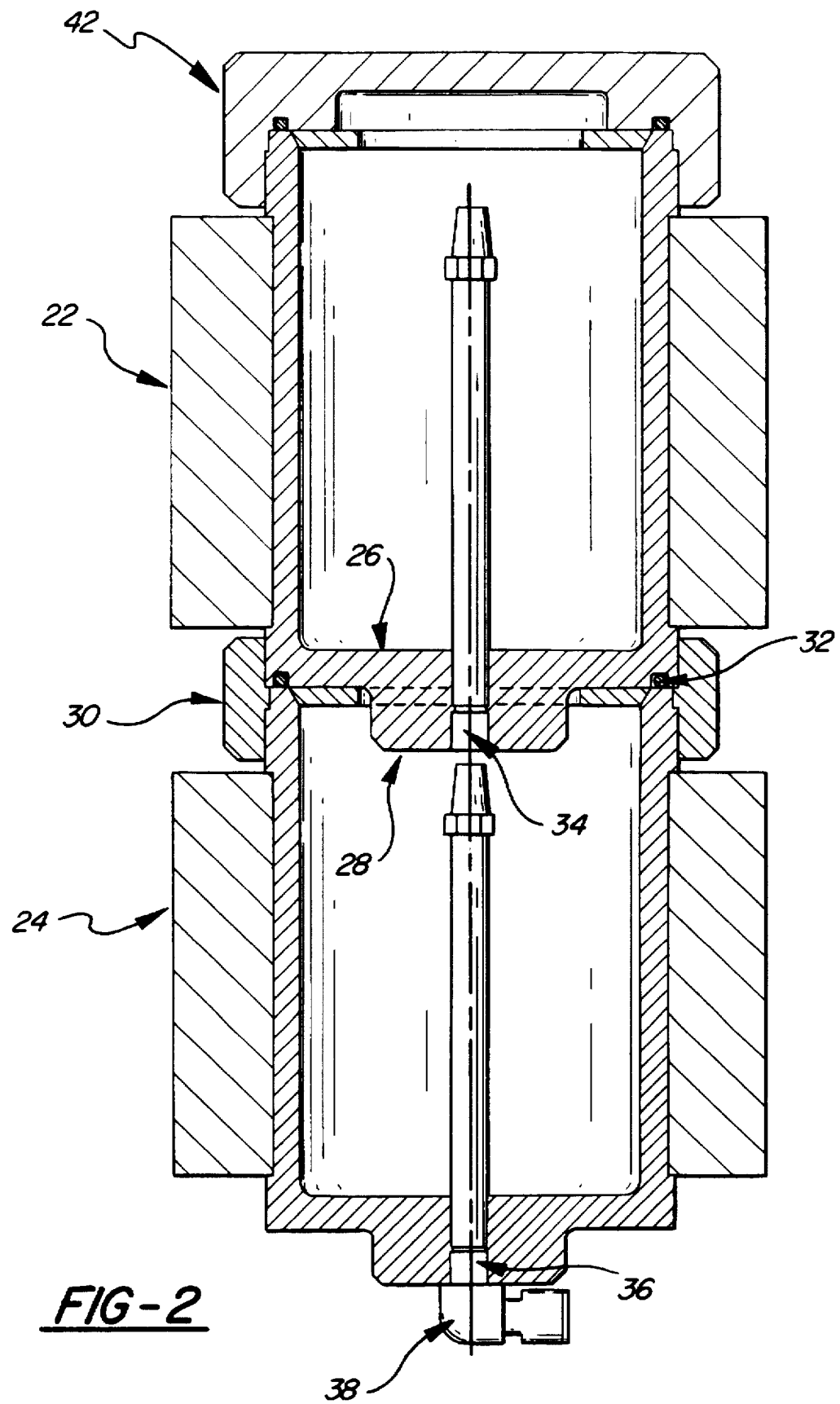
FIG. 2 depicts a plurality of two metal hydride hydrogen storage modules connected together by an adapter.

The present invention also addresses the issue of modularity. The storage capacity of the metal hydride hydrogen storage system of the present invention can be easily increased by attaching additional storage modules to the storage module 1 shown in FIG. 1. Storage modules are connected end-to-end to form a connected sequence of storage modules. FIG. 2 shows an embodiment of the metal hydride hydrogen storage system of the present invention using two storage modules, a first module 22 and a second module 24.

Figure 3:
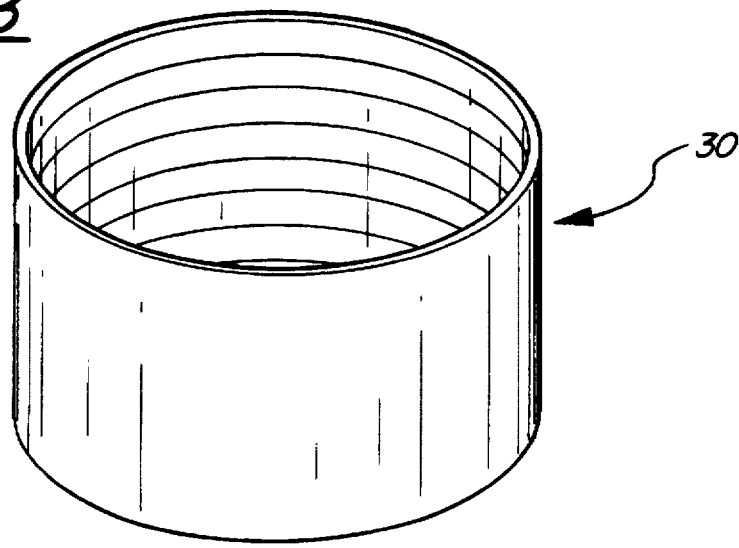
FIG. 3 depicts an adapter, annular in shape, used to connect one metal hydride hydrogen storage unit to another.

The closed end 26 of the first storage module 22 is attached to the open end 28 of the second storage module 24. They are attached using an attachment means for keeping the two storage modules securely and firmly together. An embodiment of the attachment means is the adapter 30 shown in FIG. 2 and FIG. 3. The adapter 30 is preferably an annular ring with a threaded inner surface. To accommodate the adapter 30, the outer surface of each storage module's container is also threaded near both the open and closed ends. The closed end 26 of the first storage module and the open end 28 of the second storage module can thus be screwed into the opposite ends of the adapter 30 and squeezed firmly together. A container o-ring 32 is sandwiched between closed end 26 and the rim of open end 28 to form a tight seal between the first storage module 22 and the second storage module 24. While this embodiment of the attachment means uses the adapter 30 shown in FIGS. 2 and 3, other means of connecting two storage modules are also possible. These include different types of compression fittings and clamping systems. In addition, a "quick disconnect" type of fitting may be used so that modules can easily be replaced. Moreover, the lid and container o-rings used to form the proper seals may be replaced with various types of gaskets. Container cap 42, shown in FIG. 2, covers the open end of the first storage module 22.

The passage port 34 of the first storage module 22 opens into the open end 28 of the second storage module. This permits the free flow of hydrogen gas between the first and second storage modules without the need to connect extraneous valves and tubes. Gaseous hydrogen may be introduced into the system or removed from the system by connecting a valve 38 to the passage port 36 of the second storage module.

The hydrogen storage capacity of the storage system described in the present invention may be repeatedly increased by adding additional storage modules in the same manner as described above. The storage capacity can thus be increased or decreased quickly and easily without additional devices that can add cost to the system and reduce reliability. Moreover, because of the innovative design, the storage modules can be easily disconnected and replaced.

The modularity of the system greatly simplifies the engineering effort necessary to design storage units of different capacities. Large capacity systems can be built from a plurality of identical, well understood storage modules. Such modularity eliminates the need for wasteful and costly redesign when building the larger systems.

This can especially be important in the design of the heat transfer mechanism of the storage systems. As discussed earlier, the design of a metal hydride hydrogen storage system requires a good understanding of the heat transfer properties of the system. Proper operation of the storage system requires that the underlying design includes a well engineered heat transfer mechanism that can appropriately transfer heat out of and into the hydridable material.

The design of an appropriate heat transfer mechanism depends upon many factors. These include the type and quantity of hydridable material used as well as the shape, volume and material of the container holding the metal hydride. Changing the volume of the container in order to increase hydrogen storage capacity changes the heat transfer characteristics of the storage system and requires a modification of the heat exchange system. This can increase the complexity and cost of the design process.

Because the capacity of the hydrogen storage system of the present invention is increased or decreased by adding or removing identical storage modules, the heat transfer characteristics of almost any capacity system can be understood in terms of the heat transfer characteristics of a single storage module. Hence, once a heat exchange system has been appropriately designed for a single module it is not necessary to redesign the heat transfer mechanism for larger systems. It is thus possible to provide a well engineered and highly reliable hydrogen storage system for almost any capacity of hydrogen storage.

Because the hydrogen storage system of the present invention is built by connecting together a plurality of identical storage modules, the physical dimensions of the system may easily be adapted to the packaging space available. Such adaptability can be very important when packaging space is scarce and must be efficiently utilized. This is especially important in applications where, because of space limitations, component packaging is a major engineering concern, and where improper packaging can cause many assembly and quality problems.

Finally, the metal hydride storage system of the present invention provides a way to increase hydrogen capacity quickly and easily without the need for adding extraneous valves and tubing. U.S. Pat. No. 4,548,044 to Sakai discloses a means of connecting multiple metal hydride containers together by means of an external manifold. However, the valves and tubing needed to make the connections add cost and quality problems to the system. They can crack and leak from embrittlement, fatigue and external vibration, thus decreasing the reliability of the storage system. This factor is especially important for applications where the need to package and route extraneous fuel lines can easily be a major source of design, manufacturing and quality problems.

In general, the metal hydride storage system described in the present invention provides a robust, portable, highly reliable energy source for a variety of applications. Because of the small size and high reliability of the storage modules, the described storage system is especially appealing for use as a portable energy source in remote locations (where repair and recharging facilities are unavailable).

EXAMPLES

Example 1

Figure 6:
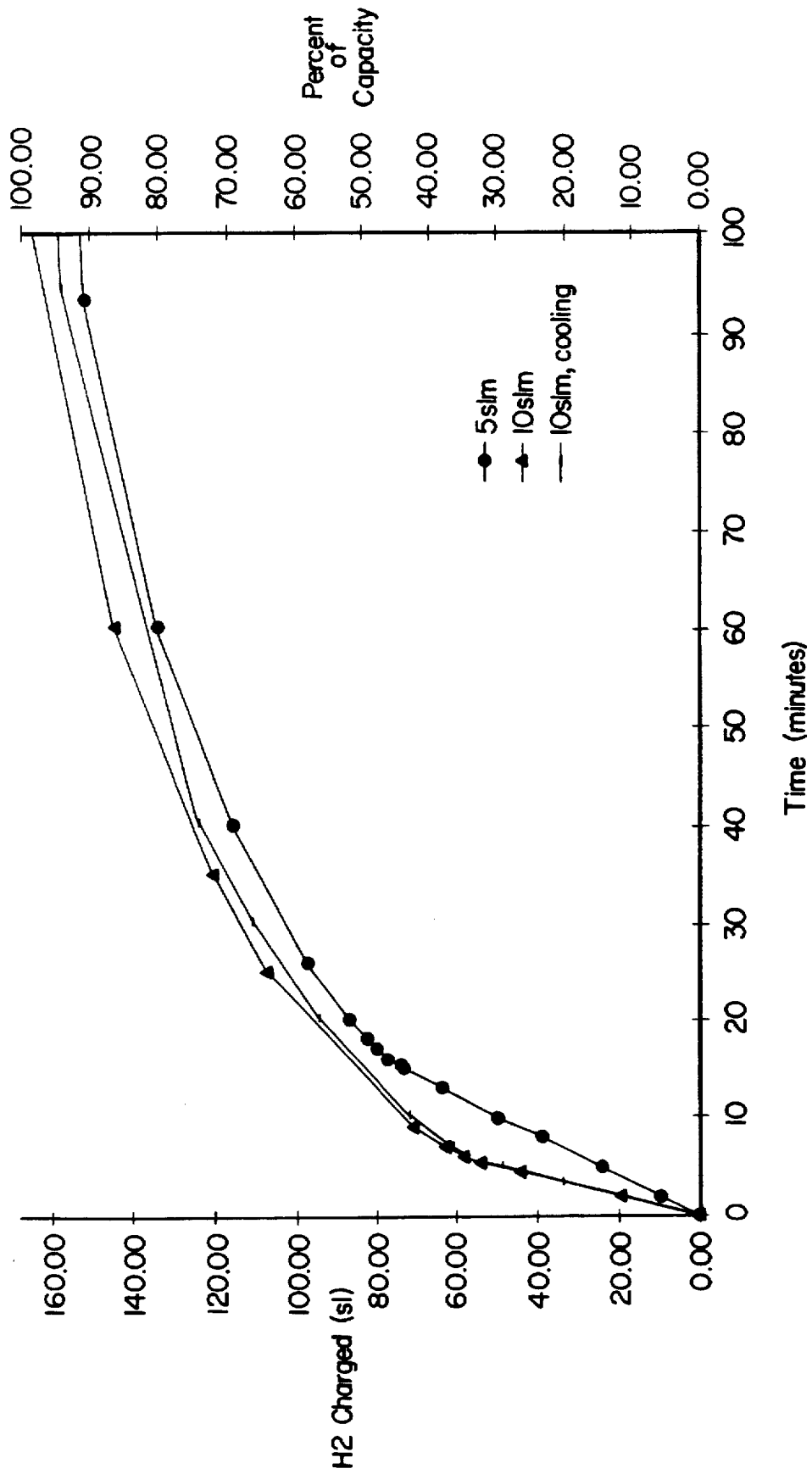
FIG. 6 shows hydrogen charging versus time for a single module hydrogen storage system having a wire mesh support means configured as a plurality of stacked disks, with regulated pressure set to 60 psi.

FIG. 6 is a series of graphs showing hydrogen charging versus time for a hydrogen storage module of the present invention comprising a single storage module. The support means used is a wire mesh comprised of nickel. The hydridable material is compacted and sintered to the support means. The configuration of the support means is that of a plurality of stacked disks.

Shown are plots of the quantity of hydrogen (in standard liters) entering the hydride hydrogen storage module over a period of time. Charging of the system is regulated at 60 psi. Maximum flow rates are set to 5 standard liters per minute, 10 standard liters, and to 10 standard liters per minute with an external cooling fan of 60 cfm.

Initially, hydrogen is flowing into the hydrogen storage module faster than it is being absorbed by the hydridable material. When the hydrogen pressure within the hydrogen storage module equals that of the regulated pressure (i.e., 60 psi), the charging rate is then dependant on the absorption of hydrogen into the hydridable material.

Example 2

Figure 7:
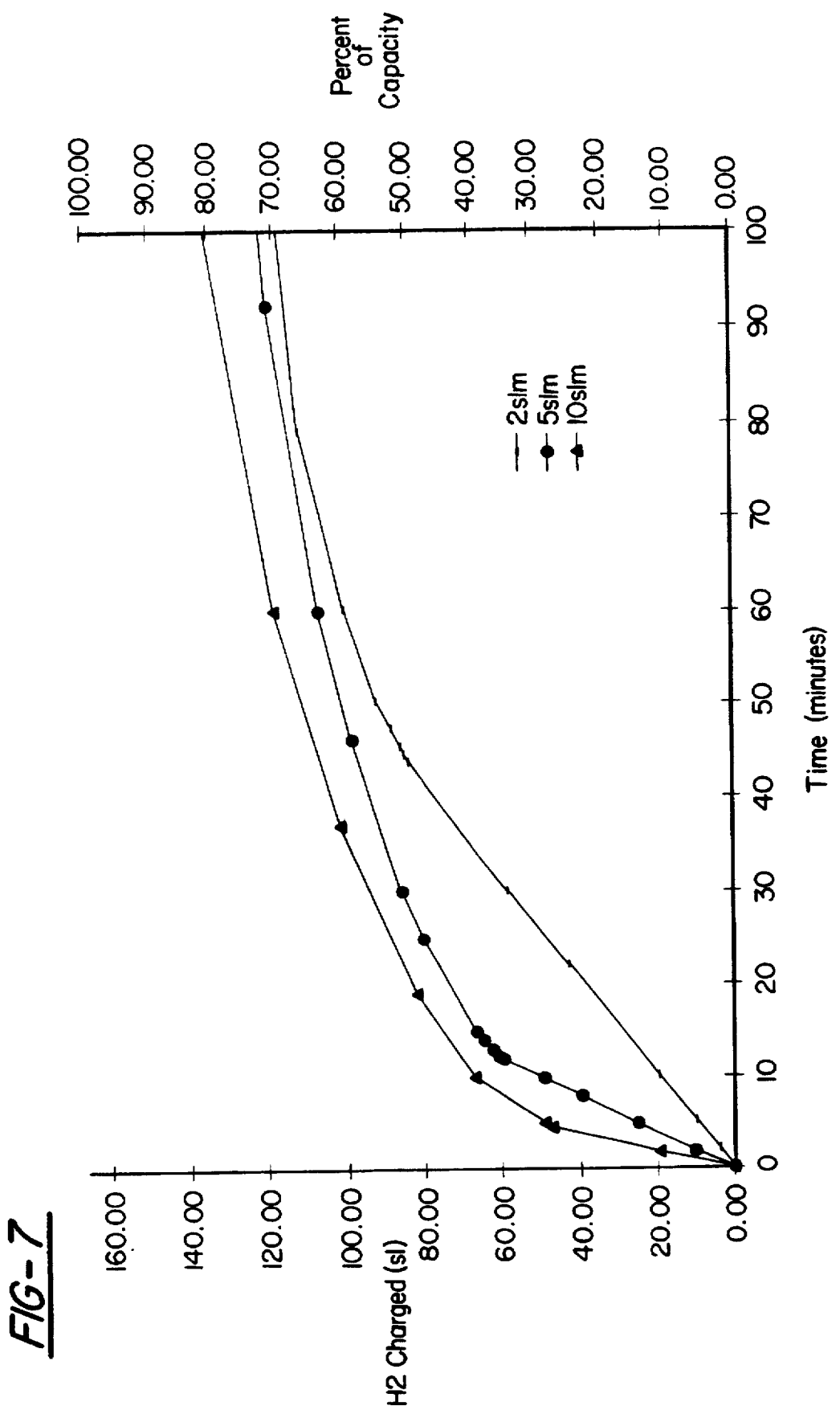
FIG. 7 shows hydrogen charging versus time for a single module hydrogen storage system having a wire mesh support means configured as a spirally wound belt, with regulated pressure set to 60 psi.

FIG. 7 shows hydrogen charging over time for a hydrogen storage system of the present invention comprising a single storage module. The support means used is a wire mesh comprised of nickel. The hydridable material is compacted and sintered to the support means. In this example, the wire mesh is configured as a spirally wound belt.

Shown are plots of the quantity of hydrogen (in standard liters) entering the hydrogen storage module over a period of time. Charging of the system is regulated at 60 psi. Maximum flow rates are set to 2 standard liters per minute, 5 standard liters per minute, and to 10 standard liters per minute.

As in Example 1, hydrogen is initially flowing into the hydrogen storage module faster than it is being absorbed by the hydridable material. When the hyrogen pressure within the hydrogen storage module equals that of the regulated pressure (i.e., 60 psi), the charging rate is then dependant on the absorption of hydrogen into the hydridable material.

Example 3

Figure 8:
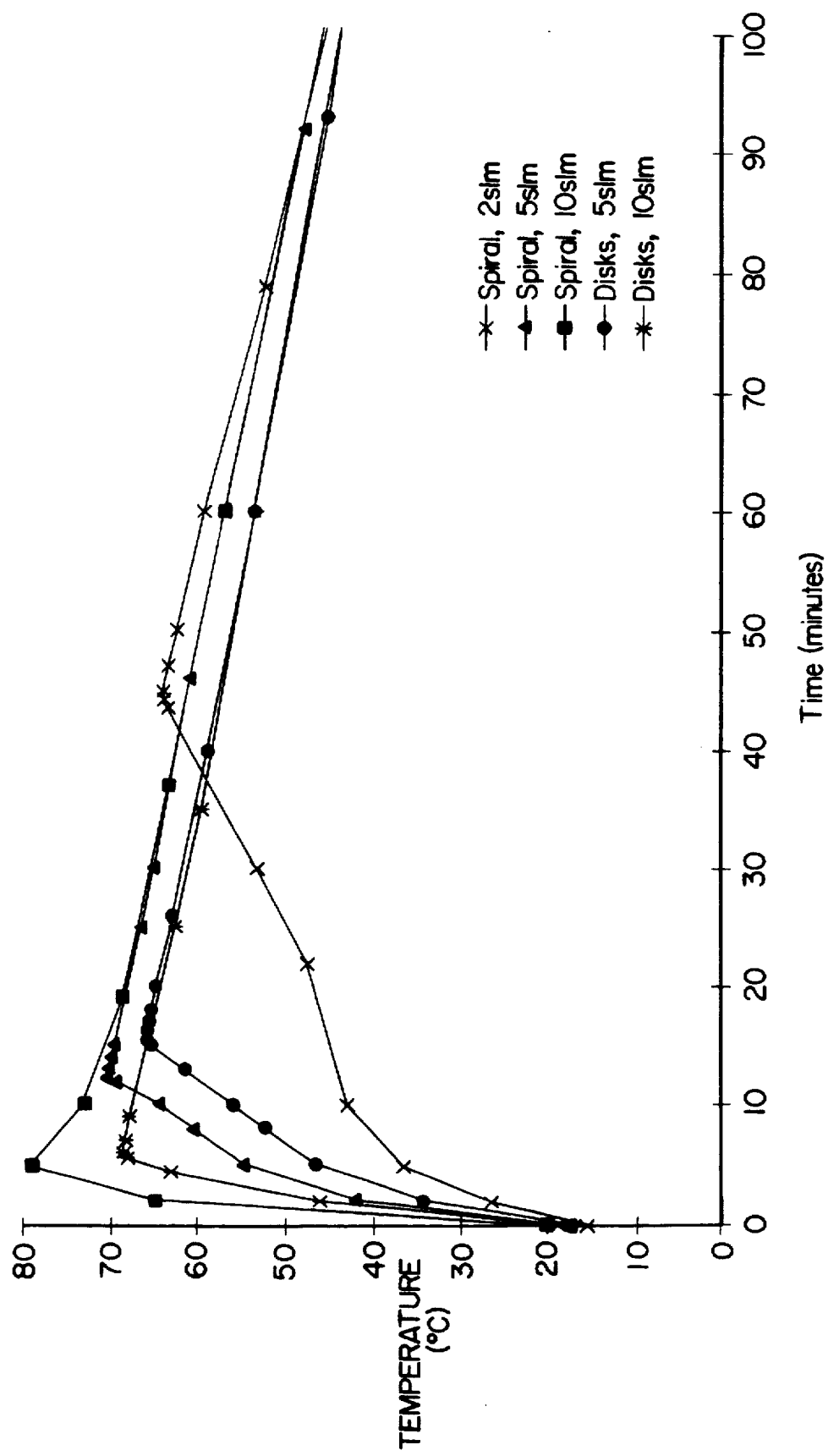
FIG. 8 depicts plots of temperature profiles of hydrogen charging versus time for single module hydrogen storage systems, with regulated pressure set to 60 psi.

FIG. 8 shows the temperature profile of the hydridable material over time during the charging process. In this example, the regulated pressure is set to 60 psi. As in the previous examples, the hydride hydrogen storage system used is a module comprising a single container, the support means used is that of a wire mesh comprised of nickel, and the hydridable material is compacted and sintered to the support means. Plots shown are those of a support means configured as a spirally wound belt at flow rates of 2, 5 and 10 standard liters per minute, and of support means configured as a plurality of stacked disks at flow rates of 5 and 10 standard liters per minutes.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A hydrogen storage system for storing hydrogen in a metal hydride, said storage system comprising:
   at least a first storage module attached to an identical second storage module, where each of said storage modules includes:
      a container for metal hydride having a closed end with a passage port; and an open end, opposite said closed end;
      metal hydride storage means positioned within said container;
      passage means, positioned within said container and gaseously connected to said passage port, for transporting gaseous hydrogen into and out of said container; and
      attachment means for connecting said closed end of each of said storage modules to said open end of a different storage module;
   where said closed end of said first storage module is attached to said open end of said second storage module and said first storage module is in gaseous communication with said second storage module through said passage port;
   and
   a container cap covering said open end of said first storage module.

2. The hydrogen storage system of claim 1, wherein said storage means comprises a hydridable material physically bonded to a support means.

3. The hydrogen storage system of claim 2, wherein said support means is selected from the group consisting of mesh, grid, matte, foil, foam and plate.

4. The hydrogen storage system of claim 3, wherein said support means is formed from metal.

5. The hydrogen storage system of claim 4, wherein said metal is selected from the group consisting of Ni, Al, Cu, Fe and mixtures or alloys thereof.

6. The hydrogen storage system of claim 2, wherein said support means is formed from metal.

7. The hydrogen storage system of claim 6, wherein said metal is selected from the group consisting of Ni, Al, Cu, Fe and mixtures or alloys thereof.

8. The hydrogen storage system of claim 6, wherein said support means is formed from expanded metal.

9. The hydrogen storage system of claim 2, wherein said support means is spirally wound within said container.

10. The hydrogen storage system of claim 2, wherein said support means is configured as a plurality of stacked disks disposed within said container.

11. The hydrogen storage system of claim 1, wherein said container is a cylinder.

12. The hydrogen storage system of claim 1, wherein said passage means is a passage tube providing gaseous communication between said passage port and the interior of said container.

13. The hydrogen storage system of claim 12, wherein said passage tube is impermeable to gaseous hydrogen.

14. The hydrogen storage system of claim 12, wherein said passage tube is permeable to gaseous hydrogen.

15. The hydrogen storage system of claim 1, where said attachment means comprises:

a threaded annular adapter for attaching said closed end of said first storage module to said open end of said second storage module.

16. The hydrogen storage system of claim 15, wherein said attachment means further comprises:

an o-ring compressed between said closed end of said first storage module and said open end of said second storage module.

17. The hydrogen storage system of claim 1, wherein each of said storage modules further comprises a heat exchange means for transferring heat into and out of said storage module.

18. The hydrogen storage system of claim 17, wherein said heat exchange means is a plurality of heat fins connected to the exterior of said container.

19. The hydrogen storage system of claim 17, wherein said heat exchange means is heat exchanger tubing.

\* \* \* \* \*